3,102,825
TREATMENT OF POLYURETHANE CELLULAR PRODUCTS
Thomas H. Rogers, Jr., Akron, and Harold H. Heineman, Louisville, Ohio, assignors to The Goodyear Tire & Rubber Company, Akron, Ohio, a corporation of Ohio
No Drawing. Filed Jan. 14, 1959, Ser. No. 787,790
8 Claims. (Cl. 117—98)

This invention relates to the treatment of flexible cellular materials. More particularly, it relates to methods for treating flexible, elastomeric, cellular polyurethane products produced from liquid reaction mixtures containing polyisocyanates and to the improved products obtained by the use of these methods.

The production of flexible cellular polyurethane products from liquid polymeric reaction mixtures containing polyisocyanates is a comparatively recent development. The reaction mixtures, from which the cellular polyurethane products are made, contain polymeric materials which are either liquid at room temperature or capable of being melted to liquids at relatively low temperatures. The polymeric materials contain active-hydrogen atoms which react with the isocyanate groups of the polyisocyanates to form a network of cross-linked molecular chains. The polyisocyanates not only function as a chain-extender and cross-linker or curative for the polymeric material, but also react with water and carboxyl groups present in the liquid reaction mixture to generate carbon dioxide which causes the liquid reaction mixture to expand and foam. A flexible elastomeric cellular polyurethane product is formed which retains its foamed cellular character after the polymer has been crosslinked or cured.

Examples of the active-hydrogen-containing polymeric materials useful in the practice of this invention are polyesters, polyesteramides, polyalkylene ether glycols, and mixtures of two or more of these. By the term "active-hydrogen" used to describe these polymeric materials is meant those hydrogen atoms which are reactive as measured and determined by the Zerewitinoff method. The polyesters referred to, are prepared by the condensation reaction between one or more glycols and one or more dibasic carboxylic acids. The polyesteramides are prepared from one or more glycols, one or more dibasic carboxylic acids and relatively small amounts of one or more bifunctional amino compounds, such as amino carboxylic acids, amino alcohols, or diamines. Small amounts of trifunctional materials may optionally be employed in preparing the active-hydrogen-containing polyesters and polyesteramides. The polyalkylene ether glycols which may be used are hydroxylterminated polyethers derived from alkylene oxides or glycols or from heterocyclic ethers, such as dioxolane. Preferred active-hydrogen-containing polymeric materials useful in the practice of this invention are the polyesters and polyethers having an average molecular weight of from approximately 1,000 to 5,000, an acid number not greater than 5, and a hydroxyl number from 20 to 110. Best results are obtained with polyesters or polyethers having an acid number not greater than 2, a hydroxyl number of approximately 60, and an average molecular weight of approximately 2,000.

Further examples of active hydrogen-containing polymeric materials and polyisocyanates as well as a discussion of the chemical reactions involved may be found in United States Patents 2,625,531; 2,625,532; and 2,625,535 and in an article in "Rubber Chemistry and Technology" for October-December 1950, pages 812 through 834. Further examples of the polyalkylene ether glycols and methods for their preparation are described in United States Patents 2,692,873 and 2,674,619.

Any organic polyisocyanate or mixtures of polyisocyanates may be employed in preparing the cellular polyurethane products. The amount of polyisocyanate employed should be at least sufficient to cross-link the active-hydrogen-containing polymeric material and to react with the water present to generate carbon dioxide gas. The carbon dioxide gas so generated causes the liquid reaction mixture to foam and form cellular products. In general, it is preferred to use from 2 to 8 equivalents of isocyanate per mol of polymeric material with best results being obtained by the use of approximately 3 mols of a diisocyanate per mol of polymeric material. Representative examples of polyisocyanates which may be employed are the diisocyanates such as hexamethylene diisocyanate; para-phenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane diisocyanate; and toluene 2,4,6 triisocyanate; the tetraisocyanates such as 4,4'-dimethyldiphenyl methane 2,2',5,5' tetraisocyanate and mixtures of polyisocyanates. Of these the liquid tolylene dissocyanates, such as 2,4 tolylene diisocyanate and 2,6 tolylene diisocyanate or mixtures thereof and toluene 2,4,6 triisocyanate are particularly preferred.

The water is provided in the reaction mixture to generate the carbon dioxide gas for foaming as well as to form possible points for cross-linking the polymeric material. In addition to the three essential ingredients (active-hydrogen-containing polymeric material, polyisocyanate and water) the reaction mixture may optionally contain pigment fillers, reinforcing agents, coloring agents, antioxidants, and catalysts.

The flexible cellular polyurethane products described above have been found most useful as cushioning materials. To perform successfully as a cushioning material, the polyurethane foam must possess certain inherent properties. It must, for instance, be soft enough to be comfortable, hard enough to provide adequate support, and resilient enough to snap back to its original shape when the load is removed. Still another desirable feature of the polyurethane foam is that it retain its original physical properties and not deteriorate while in service or storage either from the effect of oxygen and sunlight or from the effect of high humidity aging.

It has been observed that occasionally in the production of these flexible cellular products from the reaction mixtures mentioned above, the cured material offers too much resistance to compression to perform successfully as a good cushioning material. These "hard" foams are similar in nature to a semi-rigid cellular material and are not the soft flexible foam required for satisfactory cushioning. It is believed that this observed "hardness" is caused by the formation of excessive networks of crosslinks during the reaction. The reasons for this excessive crosslinking is not fully understood.

The resistance to deterioration of the polyurethane foams from the effects of oxygen and sunlight is exceptionally good as compared to foams made from rubber latex. However, it has been observed that moisture usually has a deleterious effect upon the cellular polyurethane structures. This is especially true if the structure is exposed to high-humidity air, which causes the surface of the cell walls to become somewhat tacky or sticky.

When a cellular article having such tacky cell walls is compressed, the cell walls tends to stick together so that when the load is removed, the article does not readily snap back to its original uncompressed shape or position.

It is, therefore, an object of this invention to provide a process whereby the resistance to compression of these cellular structures is reduced. Another object is to provide a method to convert relatively "hard" cellular products into more desirable cushioning materials. Still another object is to provide a process for converting a semi-rigid foamed product into a softer, more flexible, lower compression cellular product. Yet another object is to provide a method for improving the resistance of the cellular product to degradation caused by its exposure to elevated temperatures and to an atmosphere of high humidity. A specific object is to provide a process for softening the cellular product while improving its resistance to degradation without adding to the volume cost of the treated product. Other objects will appear as the description proceeds.

The objects of this invention are accomplished by treating the cured polyurethane foam with a water emulsion of "plasticizers" (a term more fully discussed below), removing any excess liquid and drying the so-treated polyurethane foam to remove any remaining water.

The specific plasticizers useful in the practice of this invention may be defined as follows:

In a book titled "Plasticizers," published by the Cleaver-Hume Press, Ltd., London, England, D. N. Buttrey has classified the more common plasticizers into the following eight distinct groups; (1) fatty acid esters, (2) phosphoric acid derivatives, (3) esters of abietic and recinoleic acids, (4) phthalic acid esters, (5) glycerol and glycol derivatives, (6) diphenyl derivatives, (7) esters of adipic and sebacic acids, and (8) miscellaneous esters.

Specific examples of fatty acid esters are: butyl laurate, diethylene glycol monolaurate, ethyl oleate, butyl oleate, amyl oleate, n-butyl stearate, amyl stearate, glycerol monostearate, diethylene glycol stearate and the like.

Specific examples of phosphoric acid derivatives are: trioctyl phosphate, triphenyl phosphate, tricresyl phosphate, tributyl glycol phosphate, octyl diphenyl phosphate, cresyl diphenyl phosphate and the like.

Specific examples of the esters of abietic and ricinoleic acids are: methyl abietate, methyl dihydroabietate, ethylene glycol diabietate, glycerol monoricinoleate, ethyl ricinoleate and the like.

Specific examples of glycerol and glycol derivatives are: polyethylene glycol, glycerol tripropionate, triethylene glycol di-2-ethylhexoate, polyethylene glycol di-2-ethylhexoate and the like.

Specific examples of diphenyl derivatives are: chlorinated diphenyls, amyl diphenyl and the like.

Specific examples of esters of adipic and sebacic acid are: dioctyl adipate, dibutoxy ethyl adipate, dibutyl sebacate, dioctyl sebacate and the like.

Specific examples of miscellaneous esters are: triethyl citrate, tributyl citrate, methyl phthalyl ethyl glycollate, glyceryl tribenzoate and diethyl oxalate and the like.

Of these, the phosphoric acid derivatives, such as octyl diphenyl phosphate; the esters of adipic and sebacic acid such as dibutyl sebacate; the glycerol and glycol derivatives such as polyethylene glycol and certain miscellaneous esters such as tributyl citrate are preferred.

It should be noted that Buttrey has classified the phthalic acid esters in a separate class. For the purpose of this invention the phthalic acid ester plasticizers are not operative and not intended to be a class of these plasticizers which improve the characteristics of polyurethane cellular structures.

The "plasticizers" employed in the practice of this invention may be characterized physically as being liquids having low volatility and relatively high boiling points (i.e. not less than about 250° C. at atmospheric pressure), and relatively low solubility in water (i.e. soluble to the extent of no more than about 5% by weight in water). The high boiling points and low water solubilities give the plasticizers a "non-fugitive" character so that in normal use, they cannot readily escape from the treated foam product. In addition, to be effective for the purposes of this invention, the plasticizers must have a swelling effect upon the treated foamed article, the actual percent swell of any given volume being determined by the amount of plasticizer retained by the dry, treated article. It has been generally observed that if the plasticizer has little or no swelling effect upon the treated article, no significant lowering of compression is achieved. The most effective plasticizers are those which cause the treated sample to swell to a percentage approximately equal to or greater than the percent plasticizer retained by the treated sample. Thus, the percent increase in density will not be greater than the percent plasticizer held by the treated polyurethane foam, because the weight/volume ratio will remain approximately the same as it was before treatment.

Generally, the amount of plasticizer employed in the practice of this invention depend upon the degree of softening of the polyurethane foam desired. Generally the more plasticizer employed the more softening is obtained and likewise the smaller the amount of plasticizer employed the less softening obtained. However it has been observed that unless a substantial softening is obtained the process is not economically feasible. Therefore, it has been found that at least about 4 or 5% by weight of plasticizer based on the original weight of the foam structure should be employed. If more than about 20% by weight of plasticizer is employed the additional softening obtained does not justify the added expense of the plasticizer. Thus, the amounts of plasticizer employed should range from about 5% to about 20% by weight based on original weight of polyurethane foam.

The treating of the foam can be most effectively accomplished by immersing the article in the emulsion of the plasticizer, although any equivalent manner of obtaining substantial saturation of the foam by the emulsion may be used. For instance, one surface of a slab of foam may be sprayed or coated with the emulsion which can then be distributed through the entire slab by repeatedly compressing and relaxing the slab. The excess emulsion, if any is present, can be conveniently removed by "wringing out" the treated article. A particularly effective method being to pass the article between rubber wringer rolls.

The removal of the water from the treated article is conveniently accomplished by placing the article in a circulating air oven at elevated temperatures. It has been found that exposing a wet treated article to a circulating air oven for about thirty minutes at 212° F. accomplishes the desired drying.

This invention is further illustrated by the following example which is illustrative and not restrictive of the scope of this invention:

EXAMPLE

A polyurethane foam was made using the following formulation in which all parts are reported by weight:

Parts
(1) Polydiethylene glycol adipate (hydroxyl number 56, acid number 1.5)_____ 100
(2) Polyoxyethylated vegetable oil (an emulsifier sold under the trade name Emulphor EL-719)__ 1.0

(3) N-methyl morpholine _____ 1.0
(4) N-ethyl morpholine _____ 0.5
(5) Water _____ 2.7
(6) Toluene diisocyanate (an 80/20 by weight mixture of the 2,4/2,6 isomers)_____ 37.0

Items 1, 2, 3, 4, and 5 above were blended together and then Item 6 was introduced and the mixture vigorously agitated for a short period of time, about 20 seconds. This composition was poured onto a flat surface and allowed to foam. The foaming was essentially complete within three minutes. This foamed slab was placed in a 212° F. circulating hot air oven for 30 minutes, then removed and allowed to cool to room temperature. This foamed structure was sliced into slabs one-inch thick. From these slabs a number of 2-inch diameter circular discs were cut. The compression at 25% deflection and density of each disc were determined and reported in the table below as the original density (column 2) and original compression (column 4).

Several specific plasticizers were added to the aforementioned discs in three different amounts, namely approximately 5%, 10% and 15% plasticizer by weight based on the weight of the original foam disc. This was done by immersing each disc in a beaker containing the plasticizer in the form of an emulsion. The discs absorbed all of the liquid in the beaker. A 10% by weight plasticizer emulsion was made using the following formula:

Parts by weight
Plasticizer (listed in table below)_____ 10
Non-ionic surface active agent [1]_____ 0.15
Water _____ 90

A water diluent was also prepared as follows:

Parts
Water _____ 100
Non-ionic surface active agent [1]_____ 0.15

[1] Octyl phenol ethylene oxide condensate
[C₈H₁₇OC₆H₄(OCH₂CH₂)O₉₋₁₀H]
sold under the trade name of Triton X–100.

This 10% plasticizer emulsion was diluted with the water diluent to form the amount of plasticizer required. For instance if 5% plasticizer by weight per weight of foam disc were to be added, one gram of 10% plasticizer emulsion as described above and 9 grams of water diluent described above were placed in a beaker and the circular foam disc allowed to soak up the total mixture in the beaker. If 10% of plasticizer by weight of sample were to be added then 2 grams of the above 10% plasticizer emulsion and 8 grams of the above water diluent were absorbed by the sample. Likewise, if 15% of plasticizer were to be added to the sample of foam, then 3 grams of 10% plasticizer emulsion and 7 grams of water diluent were absorbed by the sample. These three amounts of plasticizer are reported in the table below as percent by weight of plasticizers based on the weight of the original disc (column 1).

Each of the samples soaked in this manner were allowed to dry over night at room temperature and then treated for 2 hours in an air oven at 70° C. to remove the water. Again, the density and compression at 25% deflection of each disc were determined and are reported as final density (column 3) and final compression (column 5) in the table below.

Two discs were treated with 10 grams of the water diluent described above and treated in the same manner, i.e. dried, heated and compression and density determined. Thus, they were soaked in water and non-ionic surface active agent only and were not treated with any plasticizer. The change in compression after this water treatment of these controls amounts to 5.2%. The results of these experiments are reported in the following table. Density is reported in pounds per cubic foot; compression is reported in pounds required to deflect 50 square inches of area to 75% of its original thickness; increase in density is reported in percent. The percent decrease in compression is reported in percent change before and after treatment, but has subtracted from the actual change in compression the percent decrease in compression of the two controls (5.2%). Thus what is reported in this column is the percent decrease in compression attributable to the plasticizer only. (The percent decrease in compression due to water/nonionic surface active agent treatment having been subtracted.)

Table I

| 1 | 2 | 3 | 4 | 5 | 6 | 7 |
|---|---|---|---|---|---|---|
| Example | Orig. density | Final density | Orig. compression | Final compression | Percent Decrease in compression | Percent increase in density |
| Octyl diphenyl Phosphate: | | | | | | |
| 5% | 2.31 | 2.36 | 28.6 | 25.5 | 5.6 | 2.2 |
| 10% | 2.32 | 2.35 | 28.3 | 23.9 | 10.3 | 1.9 |
| 15% | 2.30 | 2.32 | 29.4 | 22.7 | 17.6 | 0.1 |
| Polyethylene Glycol P400: | | | | | | |
| 5% | 2.28 | 2.32 | 29.0 | 25.3 | 7.5 | 1.8 |
| 10% | 2.28 | 2.38 | 28.6 | 23.7 | 11.9 | 4.4 |
| 15% | 2.30 | 2.53 | 28.6 | 24.0 | 10.9 | 10.0 |
| Chlorinated diphenyl: | | | | | | |
| 5% | 2.30 | 2.38 | 28.3 | 26.2 | 2.2 | 3.5 |
| 10% | 2.32 | 2.35 | 27.8 | 25.8 | 2.0 | 1.3 |
| 15% | 2.27 | 2.28 | 27.3 | 24.6 | 4.7 | 0.4 |
| Dibutyl Sebacate: | | | | | | |
| 5% | 2.28 | 2.30 | 26.5 | 23.1 | 7.6 | 0.9 |
| 10% | 2.31 | 2.45 | 27.8 | 23.7 | 9.6 | 6.1 |
| 15% | 2.33 | 2.55 | 28.0 | 24.3 | 8.0 | 9.5 |
| Ethyl Oleate: | | | | | | |
| 5% | 2.32 | 2.44 | 28.9 | 25.3 | 7.2 | 5.2 |
| 10% | 2.32 | 2.54 | 29.1 | 25.4 | 7.5 | 9.5 |
| 15% | 2.29 | 2.63 | 28.9 | 25.6 | 6.2 | 14.8 |
| Tributyl Citrate: | | | | | | |
| 5% | 2.27 | 2.29 | 29.4 | 25.7 | 7.4 | 0.1 |
| 10% | 2.25 | 2.28 | 28.6 | 24.4 | 9.5 | 1.3 |
| 15% | 2.28 | 2.35 | 28.5 | 23.4 | 13.0 | 3.1 |
| Methyl abietate: | | | | | | |
| 5% | 2.30 | 2.36 | 28.6 | 24.8 | 7.8 | 2.2 |
| 10% | 2.33 | 2.46 | 29.1 | 25.3 | 6.3 | 5.6 |
| 15% | 2.30 | 2.55 | 29.7 | 24.9 | 9.0 | 10.9 |
| Water diluent | 2.33 | 2.34 | 29.0 | 27.6 | 0 | 0.4 |
| | 2.29 | 2.30 | 29.0 | 27.5 | 0 | 0.4 |

Similar results may be obtained by employing other liquid plasticizers mentioned above by employing amounts ranging from about 5% by weight of plasticizer up to about 20% by weight plasticizer based on the original weight of the cured polyurethane foam. Other polyurethane foams prepared as previously described may also be treated in accordance with this invention to obtain similar results. Other methods of treatment of polyurethane foam such as spraying and coating may be employed to apply the liquid plasticizers to the polyurethane foam which is desired to be treated. While the embodiment illustrated here is one of so-called "batch" process this invention may be practiced on a continuous basis. For instance, polyurethane foam is prepared on a continuous basis by employing a constant flow of reactants which are mixed and allowed to foam on a moving belt. This belt then passes through a curing unit and long continuous sheets of foam are thus prepared. If it is desired to employ the process of this invention to such foam it would be within the skill of the art to employ the process of this invention to a continuous operation.

While certain representative embodiments and details have been shown for the purpose of illustrating the invention, it will be apparent to those skilled in this art that various changes and modifications may be made therein without departing from the spirit or scope of the invention.

We claim:

1. The method of lowering the compression and of improving the humidity aging of cured polyurethane foams prepared from water, organic polyisocyanates and active-hydrogen-containing polymeric materials selected from the group consisting of polyesters, polyesteramides, polyalkylene ether glycols and mixtures thereof, said polymeric materials having an average molecular weight ranging from 1000 to 5000, an acid number not greater than 5, an hydroxyl number ranging from 20 to 110, which comprises subjecting the fully cured polyurethane foam to a water emulsion of at least one low volatile, high boiling, low water soluble organic plasticizer selected from the group consisting of butyl laurate, diethylene glycol monolaurate, ethyl oleate, butyl oleate, amyl oleate, n-butyl stearate, amyl stearate, glycerol monostearate, diethylene glycol stearate, trioctyl phosphate, triphenyl phosphate, tricresyl phosphate, tributyl glycol phosphate, octyl diphenyl phosphate, cresyl diphenyl phosphate, methyl abietate, methyl dihydroabietate, ethylene glycol diabietate, glycerol monoricinoleate, ethyl ricinoleate, polyethylene glycol, glycerol tripropionate, triethylene glycol di-2-ethylhexoate, polyethylene glycol di-2-ethylhexoate, chlorinated diphenyls, amyl diphenyl, dioctyl adipate, dibutoxy ethyl adipate, dibutyl sebacate, dioctyl sebacate, triethyl citrate, tributyl citrate, methyl phthalyl ethyl glycollate, glyceryl tribenzoate, diethyl oxalate in an amount so that at least 4% by weight of plasticizer based on the original weight of the foam so-treated is retained, and drying the so treated fully cured polyurethane foam to remove moisture.

2. The method according to claim 1 in which the plasticizer is dibutyl sebacate.

3. The method according to claim 1 in which the plasticizer is tributyl citrate.

4. The method according to claim 1 in which the plasticizer is methyl abietate.

5. The method according to claim 1 in which the plasticizer is octyl diphenyl phosphate.

6. The method of lowering the compression and of improving the humidity aging of cured polyurethane foams prepared from water, organic polyisocyanates and active-hydrogen-containing polymeric materials selected from the group consisting of polyesters, polyesteramides, polyalkylene ether glycols and mixtures thereof, said polymeric materials having an average molecular weight ranging from 1000 to 5000, an acid number not greater than 5, an hydroxyl number ranging from 20 to 110, which comprises subjecting the fully cured polyurethane foam to a water emulsion of at least one low volatile, high boiling, low water soluble organic plasticizer selected from the group consisting of butyl laurate, diethylene glycol monolaurate, ethyl oleate, butyl oleate, amyl oleate, n-butyl stearate, amyl stearate, glycerol monostearate, diethylene glycol stearate, trioctyl phosphate, triphenyl phosphate, tricresyl phosphate, tributyl glycol phosphate, octyl diphenyl phosphate, cresyl diphenyl phosphate, methyl abietate, methyl dihydroabietate, ethylene glycol diabietate, glycerol monoricinoleate, ethyl ricinoleate, polyethylene glycol, glycerol tripropionate, triethylene glycol di-2-ethylhexoate, polyethylene glycol di-2-ethylhexoate, chlorinated diphenyls, amyl diphenyl, dioctyl adipate, dibutoxy ethyl adipate, dibutyl sebacate, dioctyl sebacate, triethyl citrate, tributyl citrate, methyl phthalyl ethyl glycollate, glyceryl tribenzoate, diethyl oxalate, said plasticizers being characterized as liquids having a relatively high boiling point of not less than 250° C. at atmospheric pressure and relatively low solubles in water of no more than about 5% by weight in an amount so that at least 4% by weight of plasticizer based on the original weight of the foam so-treated is retained, and drying the so treated polyurethane foam to remove moisture.

7. A cured, flexible cellular polyurethane foam pre-prepared from a liquid reaction mixture of water, organic polyisocyanate and an active-hydrogen-containing polymeric material selected from the group consisting of polyesters, polyester amides, polyalkylene ether glycols and mixtures thereof, said polymeric materials having an average molecular weight ranging from 1000 to 5000, an acid number not greater than 5, a hydroxyl number ranging from 20 to 110, impregnated with at least one low volatile, high boiling, low water soluble organic plasticizer selected from the group consisting of butyl laurate, diethylene glycol monolaurate, ethyl oleate, butyl oleate, amyl oleate, n-butyl stearate, amyl stearate, glycerol monostearate, diethylene glycol stearate, trioctyl phosphate, triphenyl phosphate, tricresyl phosphate, tributyl glycol phosphate, octyl diphenyl phosphate, cresyl diphenyl phosphate, methyl abietate, methyl dihydroabietate, ethylene glycol diabietate, glycerol monoricinoleate, ethyl ricinoleate, polyethylene glycol, glycerol tripropionate, triethylene glycol di-2-ethylhexoate, polyethylene glycol di-2-ethylhexoate, chlorinated diphenyls, amyl diphenyl, dioctyl adipate, dibutoxy ethyl adipate, dibutyl sebacate, dioctyl sebacate, triethyl, citrate, tributyl citrate, methyl phthalyl ethyl glycollate, glyceryl tribenzoate, diethyl oxalate, said foams retaining at least 4% by weight of plasticizer based on the original weight of said foam.

8. The cured, flexible cellular polyurethane according to claim 7 wherein the said foam is treated with a plasticizer comprising octyl diphenyl phosphate.

References Cited in the file of this patent
UNITED STATES PATENTS

| | | |
|---|---|---|
| 2,664,366 | Wilson | Dec. 29, 1953 |
| 2,811,493 | Simon et al. | Oct. 29, 1957 |
| 2,850,464 | Mitchell | Sept. 2, 1958 |
| 2,888,413 | Pace | May 26, 1959 |
| 2,900,278 | Powers et al. | Aug. 18, 1959 |
| 2,956,031 | Khawam | Oct. 11, 1960 |
| 2,972,545 | Buskin | Feb. 21, 1961 |
| 2,977,127 | Mertes | Mar. 28, 1961 |
| 3,016,555 | Penoyer et al. | Jan. 16, 1962 |

OTHER REFERENCES

Buttrey, D. N., "Plasticizers," second edition, Cleaver-Hume Press Ltd., London, 1957, pages 41–46.